United States Patent
Vigerström

[11] 3,877,360
[45] Apr. 15, 1975

[54] CONTAINER FOR THE TREATMENT OF THE CONTENTS BY PASSING ELECTRIC CURRENT THERETHROUGH

[75] Inventor: Knut Birger Vigerström, Stockholm, Sweden

[73] Assignee: Electro-Food AB, Solna, Sweden

[22] Filed: Sept. 27, 1972

[21] Appl. No.: 292,787

[30] Foreign Application Priority Data
Sept. 29, 1971 Sweden .......................... 12342

[52] U.S. Cl. ................................. 99/358; 219/284
[51] Int. Cl. ............................................ H05b 3/60
[58] Field of Search ............ 99/358, 357, 359, 485, 99/486, 645, 646 R, 646 C; 220/1 R, 1 S; 219/290, 289, 294, 293, 292, 284

[56] References Cited
UNITED STATES PATENTS
| | | | |
|---|---|---|---|
| 1,175,442 | 3/1916 | Hanks | 219/292 |
| 2,364,537 | 12/1944 | Kerth | 99/359 |
| 3,543,673 | 12/1970 | McDevitt | 99/358 |

FOREIGN PATENTS OR APPLICATIONS
| | | | |
|---|---|---|---|
| 43-5698 | 3/1968 | Japan | 219/284 |
| 1,263,199 | 3/1968 | Germany | 219/284 |
| 97,592 | 12/1939 | Sweden | 219/292 |

Primary Examiner—Harvey C. Hornsby

[57] ABSTRACT

In a container, e.g., a tin can for foodstuffs in which the contents are to be treated by passing electric current therethrough, the invention provides means permitting the insertion of the necessary electrodes without damaging the product contained therein. The container comprises a separate channel which can be opened to the outside of the container and into which an electrode can be inserted without contacting the product. This channel can, if desired, be withdrawn from the container after inserting the electrode and before passing current through the product. The second electrode can be formed by an outer metal wall of the container or by a special sleeve member inserted into a peripheral channel in the container.

9 Claims, 3 Drawing Figures

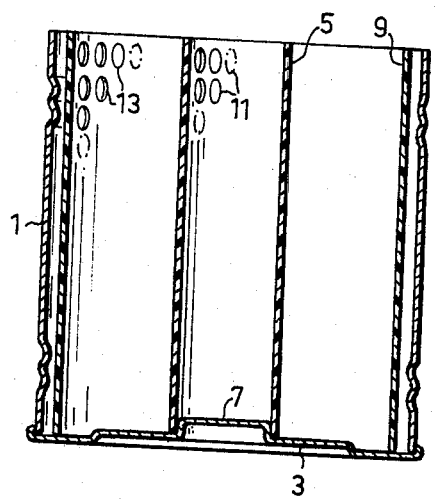
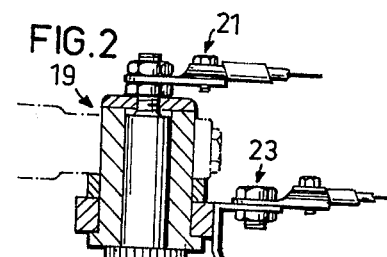
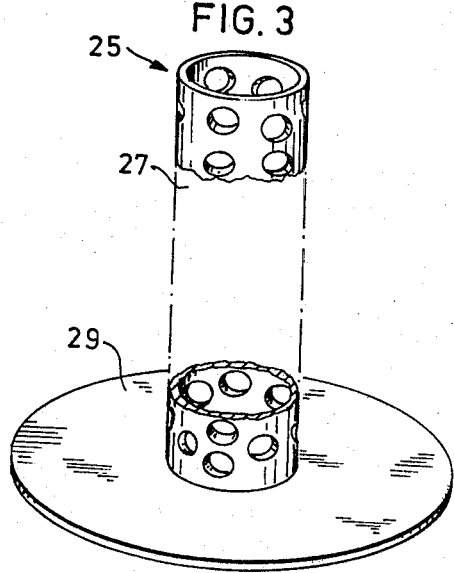
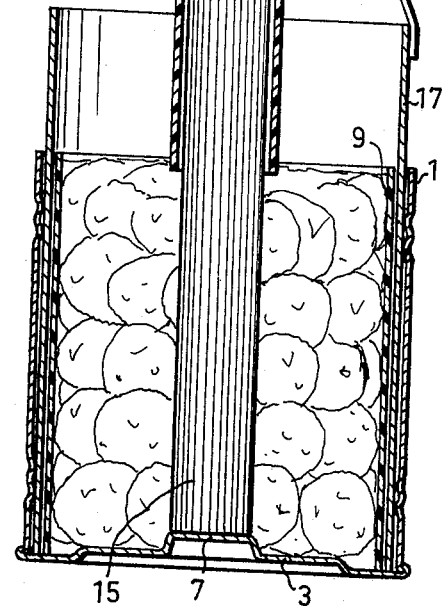

CONTAINER FOR THE TREATMENT OF THE CONTENTS BY PASSING ELECTRIC CURRENT THERETHROUGH

The invention concerns a container, especially for food, for permitting treatment by passing electric current through the contents by establishing electric current paths between two electrodes in contact with a liquid enclosed in the container.

It is a purpose of the invention to form such a container which may be a tin can, a sealed carton, a plastic bag or box or other enclosure, so that the packed product is not damaged when the electrodes for the electric current treatment are inserted but also so that the electrodes can be placed in the location most advantageous from the electrical point of view. According to the invention this is attained by the fact that the container comprises at least one channel which can be opened towards the outside of the container so as to permit the insertion of a first one of said electrodes into the channel. The channel may have openings through which its inside communicates with the space containing the product and/or be removable after the insertion of the electrode so as to permit contact between the electrode and the liquid.

The container according to the invention should preferably not, or only slightly, differ from conventional containers and preferably present the same outer dimensions as these so that existing packing machines and distribution means can be used. According to the invention this is obtained with a container in which the channel is formed as a separate insert in the container.

A container according to this embodiment can be provided with an insert made of electrically insulating material and comprising a tubular portion arranged for central location in the container and for receiving said first electrode. A bottom plate may be connected with the central tube and have essentially the same dimensions as the bottom of the container, for example a tin can. The insert may also comprise a sleeve portion conforming with the outer wall of the container. If the insert comprises a bottom plate and central and/or peripheral tube member, the insert forms a basket by which the contents of the can is removable.

Embodiments of the invention will be described in the following with reference to the accompanying drawings, in which FIG. 1 shows an axial section through a food can according to the invention.

FIG. 2 shows an axial section through the can according to FIG. 1 placed into a device for treating the content by passing electric current therethrough.

FIG. 3 is a perspective view of an insert for a can according to the invention.

FIG. 1 shows a can with a side wall 1 of sheet metal and a profiled bottom 3 of insulating material. A central inner insert tube or channel 5 of insulating material is placed into the can with its lower end engaging a raised portion 7 of the can bottom 3. Another outer insert tube or sleeve 9 of a diameter only slightly smaller than the inner diameter of the side wall of the can and made of insulating material rests with its lower edge on the can bottom 3. The inner tube 5 as well of the outer sleeve on channel 9 have a large number of openings or perforations 11 and 13, respectively.

A product packed in the can shown in FIG. 1 can be treated by passing electric current therethrough by connecting the outer metal wall 1 of the can to one pole of a source of electric voltage and by connecting the other pole of said voltage source to an electrode which is inserted into the inner tube 5. The metal wall of the can thus forms one electrode.

The active surfaces of both electrodes should have about the same size during the current treatment. The active surface of the central electrode should therefore be as large as possible, and for this reason it might be desirable to remove the inner tube 5 from the container when the electrode has been inserted. The tube 5 has then fullfilled its task consisting in permitting the electrode to be inserted without damaging the product packed.

In conventional tin cans the inside of the side wall of the can is usually protected by a coating of lacquer. If such coated sheet metal is used as an electrode, the contents of the container might be discoloured and in the case of foodstuffs change in taste. In order to avoid this, the current treatment of the packed product can be effected with the help of two separate electrodes inserted into the can. An example hereof is illustrated in FIG. 2

According to FIG. 2 the can shown in FIG. 1 is used which comprises a sheet metal side wall 1, an insulating bottom 3 and inner and outer insulating insert tubes 5 and 9. A current supply electrode 15 is inserted into the inner tube 5 so as to rest with its lower end on the raised portion 7 of the bottom 3. The protection tube 5 is thereafter withdrawn upwards to the position indicated in FIG. 2. Simultaneously with the insertion of the electrode 15, an outer cylindrical electrode 17 is inserted between the outer insulating tube 9 and the can wall 1. The central electrode can be of carbon, the cylindrical electrode 17 of stainless steel. The electrodes 15 and 17 are sustained by a support 19 and are connected to terminals 21 and 23.

In the embodiment of FIGS. 1 and 2 the insulating can insert can also comprise a bottom united to the outer tubular insert 9 so as to form a basket by means of which the contents of the can can be lifted out.

FIG. 3 is a perspective view of an insert 25 of insulating material for a can, which can may be entirely of sheet metal. The insert 25 comprises a central, perforated tube 27 of essentially the same height as the can and a bottom sheet 29 of essentially the same dimensions as the can bottom. This insert 25 is inserted into the can before the product is packed into it. When the contents of the can are to be treated by passing electric current theretrhough, a central electrode is inserted into the tube 27. The other electrode can be formed by the side wall of the can or by a separate cylindrical electrode placed inside the can wall. The bottom sheet 29 prevents creeping currents to pass between the central and the peripheral electrodes.

What is claimed is:

1. A container for heating foodstuff contained therein comprising:
   a. an electrically conductive wall forming an enclosure for the foodstuff and adapted to be connected to an electrical supply source to thereby form a first electrode;
   b. a bottom having an electrically insulating inner surface;
   c. an electrically insulating inner wall disposed between said electrically conductive wall and the foodstuff for preventing direcct contact of said electrically conductive wall with the foodstuff; and d. a channel member of insulating material disposed within said enclosure for receiving a second electrode adapted to be connected to said electrical supply source and for preventing the second electrode from contacting and thereby damaging the foodstuff when inserted into said enclosure, said channel member and said insulating inner wall each being provided with a plurality of perforations so that liquid within said enclosure may thereby contact the first and second electrodes to provide an electrical connection enabling the foodstuff to be heated when current is passed between the first and second electrodes.

2. A container as described in claim 1 wherein said channel member is removable after insertion of the second electrode therein to permit contact between the second electrode and the foodstuff.

3. A container as described in claim 1 wherein said channel member is formed as a separate insert disposed in said enclosure.

4. A container as described in claim 3 wherein said insert comprises a tubular portion for substantially central location in said enclosure for receiving said second electrode.

5. A container as described in claim 4 wherein said tubular portion is withdrawable from said enclosure after insertion of the second electrode thereinto.

6. A container as described in claim 3 wherein said inner wall comprises a sleeve member disposed adjacent to said electrically conductive wall.

7. A container as described in claim 3 wherein said insert is integral with said bottom thereby providing a basket for permitting removal of the foodstuff from said enclosure by removal of said insert.

8. A container as described in claim 6 wherein said electrically conductive wall has an electrode surface area uncovered by the perforations in said electrically insulating inner wall approximately of the same order of magnitude as the surface area of the second electrode.

9. A container for heating foodstuff contained therein comprising:

a. a wall forming an enclosure for the foodstuff;

b. a bottom having an electrically insulating inner surface joined to said wall;

c. an electrically insulating inner wall formed as a sleeve member disposed between said wall and the foodstuff for preventing direct contact of said wall with the foodstuff and for enabling the insertion of a first electrode between said wall and said electrically insulating inner wall, the first electrode adapted to be connected to an electrical supply source; and d. a channel member of insulating material disposed within said enclosure for receiving a second electrode adapted to be connected to an electrical supply source and for preventing the second electrode from contacting and thereby damaging the foodstuff when inserted into said enclosure, said channel member and said insulating inner wall each being provided with a plurality of perforations so that liquid within said enclosure may thereby contact the first and second electrodes to provide an electrical connection enabling the foodstuff to be heated when current is passed between the first and second electrodes.

* * * * *